United States Patent
Sun et al.

(10) Patent No.: US 7,545,593 B1
(45) Date of Patent: Jun. 9, 2009

(54) MAGNETIC STORAGE SYSTEMS AND METHODS WITH TIGHTER WRITE FAULT WINDOW TO IMPROVE RELIABILITY

(75) Inventors: Yu Sun, Fremont, CA (US); Bill Flynn, San Jose, CA (US); Don Brunnett, Pleasanton, CA (US)

(73) Assignee: Maxtor Corporation, Scotts Valley, CA (US)

( * ) Notice: Subject to any disclaimer, the term of this patent is extended or adjusted under 35 U.S.C. 154(b) by 114 days.

(21) Appl. No.: 11/075,285

(22) Filed: Mar. 8, 2005

Related U.S. Application Data

(60) Provisional application No. 60/599,795, filed on Aug. 6, 2004.

(51) Int. Cl.
*G11B 27/36* (2006.01)
*G11B 15/04* (2006.01)
*G11B 19/04* (2006.01)
*G11B 5/596* (2006.01)

(52) U.S. Cl. .................... 360/31; 360/60; 360/77.08
(58) Field of Classification Search ............... None
See application file for complete search history.

(56) References Cited

U.S. PATENT DOCUMENTS

| | | | |
|---|---|---|---|
| 6,094,806 A | 8/2000 | McNeil et al. | |
| 6,178,058 B1 | 1/2001 | Pan et al. | |
| 6,226,140 B1 | 5/2001 | Serrano et al. | |
| 6,429,990 B2 | 8/2002 | Serrano et al. | |
| 6,496,315 B1 | 12/2002 | Ueda et al. | |
| 6,657,805 B2* | 12/2003 | Nishida et al. | 360/60 |
| 6,671,110 B2* | 12/2003 | Baba et al. | 360/31 |
| 6,714,371 B1 | 3/2004 | Codilian | |
| 6,714,372 B1* | 3/2004 | Codilian et al. | 360/60 |
| 6,717,757 B1 | 4/2004 | Levy et al. | |
| 6,735,033 B1 | 5/2004 | Codilian et al. | |
| 6,788,480 B1 | 9/2004 | Codilian et al. | |
| 6,795,262 B1 | 9/2004 | Codilian et al. | |
| 6,798,610 B1 | 9/2004 | Deng et al. | |
| 6,882,489 B1* | 4/2005 | Brunnett et al. | 360/60 |
| 2004/0125486 A1* | 7/2004 | Schmidt | 360/53 |
| 2004/0125496 A1* | 7/2004 | Schmidt | 360/77.08 |
| 2005/0152057 A1* | 7/2005 | Schmidt | 360/60 |

* cited by examiner

*Primary Examiner*—Joseph H Feild
*Assistant Examiner*—Daniell L Negrón
(74) *Attorney, Agent, or Firm*—Westman, Champlin & Kelly, P.A.

(57) ABSTRACT

A magnetic storage system includes a disk, a head, an actuator, and a servo controller. The servo controller monitors a value, such as a position error signal (PES) sample value, a predicted PES sample value, and the like, that is based on servo information provided by the head. The servo controller provides a signal to inhibit writing by the head based on a comparison of the monitored value with a threshold, such as a write fault window (WFW), a PES plus Velocity (PPV) threshold, and the like. The servo controller sets the threshold to a first value based on at least one of an on-track track misregistration (TMR) value and a seek settle TMR value. When the servo controller determines that the head is subject to a vibration condition, the servo controller sets the threshold to a second value that is different from the first value.

29 Claims, 11 Drawing Sheets

MAGNETIC STORAGE SYSTEMS AND METHODS WITH TIGHTER WRITE FAULT WINDOW TO IMPROVE RELIABILITY

CROSS-REFERENCE TO RELATED PATENT APPLICATIONS

Embodiments of the present invention relate to U.S. Provisional Application Ser. No. 60/599,795, filed Aug. 6, 2004, entitled "Dynamic Write Fault Window to Improve Disk Drive Reliability under Operational Shock", the contents of which are incorporated by reference herein and which is a basis for a claim of priority.

BACKGROUND OF THE INVENTION

1. Field of the Invention

Embodiments of the present invention relate generally to magnetic storage systems and methods and, in specific embodiments, to a magnetic storage system including a head and a servo controller in which the servo controller sets a threshold, such as a write fault window (WFW), a PES plus Velocity (PPV) threshold, and the like, to a first value based on at least one of an on-track track misregistration (TMR) value and a seek settle TMR value, and sets the threshold to a second value that is different from the first value when it is determined that the head is subject to a vibration condition.

2. Related Art

Magnetic storage systems, such as disk drives, are widely used in computers and other electronic devices for the storage and retrieval of data. Important design considerations for disk drive manufacturers generally include: (a) data storage capacity; (b) data transfer rate; (c) data integrity and reliability; and (d) manufacturing cost. Of those considerations, data integrity and disk drive reliability are of particular importance, because incorrect or corrupted data may lead to erroneous calculation results, incorrect program execution, or other similar problems.

In general, related art disk drives comprise one or more disks for storing data, an actuator, and one or more transducers or heads. Each head is operable to read data from and write data to concentric circular tracks on a surface of a corresponding disk. The heads are typically attached to the actuator, and when a head performs a read or a write operation, the actuator is moved so that the head is positioned over a center of a selected track for the operation.

In recent years, disk drive manufacturers have sought to increase the data storage capacity of disk drives while controlling the manufacturing cost. One solution has been to increase track density by increasing the number of tracks per inch (TPI) on each disk. As TPI has increased, tracks have become narrower, and maintaining data integrity has become a greater design challenge because data errors can occur with smaller amounts of movement of a head away from a track center during a read or a write operation.

Movement a head away from a track center can lead to an off-track read or an off-track write. An off-track read occurs when a head is positioned over a wrong track during a read operation and the head reads data from the wrong track. In such an instance, the incorrect data would have to be discarded, the head repositioned over the correct track, and the head would then have to read in the correct data. As a consequence, the data transfer rate of the disk drive would be reduced, because the time spent reading the wrong data would be wasted. Even worse than an off-track read is an off-track write. An off-track write occurs when a head is positioned over a wrong track during a write operation and the head writes data to the wrong track. As a result of an off-track write, data integrity is adversely affected, because existing data on the wrong track is improperly overwritten and is potentially lost.

Thus, to prevent data errors, it is preferable to maintain a head over a center of a selected track during a read or a write operation. In order to position a head during a read or a write operation, prior art disk drives typically comprise a servo controller and have embedded servo sectors located in the tracks of each disk. The embedded servo sectors are located between data sectors and contain predetermined patterns from which a position of a head during an operation can be determined.

During read and write operations to a selected track, a head reads data from embedded servo sectors of the selected track and provides the data read from the embedded servo sectors as servo information to a servo controller. The servo controller receives the servo information provided by the head and determines a position error signal (PES) from the servo information. The PES is a signal that is indicative of a position of the head relative to a center of the selected track. The PES is usually specified in terms of a percentage (+/-) that the head is away from the center of the selected track. The servo controller then sends a positioning signal to reposition an actuator based on the PES so that the head is moved toward the center of the selected track.

Using a PES to reposition a head of a disk drive over a track center generally permits for satisfactory performance when the disk drive operates under normal, vibration free, conditions. Vibration free conditions exist when a disk drive is not subject to movement or vibrations from external sources. However, even under vibration free conditions, there may still be some internal factors that can cause misalignment of a head. A non-exhaustive list of such internal factors is discussed in U.S. Pat. No. 6,094,806 entitled "Method for Fabricating a Dual Element Head", and includes spindle run out, resonances and disk flutter, thermal track shift, head settling, actuator interactions, improper servo writing, and the like.

Expected movements of a head away from a track center under vibration free conditions can be statistically or experimentally determined, and can be quantified as values, such as an on-track track misregistration (TMR) value and a seek settle track misregistration (TMR) value. An on-track TMR value is a percentage value representing a maximum amount of misalignment of a head from a track center that is probable during normal track following operations. Similarly, a seek settle TMR value is a percentage value representing a maximum amount of misalignment of a head from a track center that is probable during seek settle under vibration free conditions. Seek settle occurs when an actuator moves a head to a new track for a read or a write operation. When moving the head to the new track, the actuator may overshoot the track and have to be repositioned. Seek settle refers to the time during which the head settles into the new track before beginning the operation. The on-track TMR value and the seek settle TMR value for a particular head of a particular disk drive may be statistically approximated from a known operation of similar disk drives, or may be determined during a self-test operation of the particular disk drive.

When operating in various environments, a disk drive may be subject to external forces in the form of vibrations or shocks. Vibrations may be caused by, for example, mechanical interactions between disk drives that operate on a same computer rack, and the like. When a disk drive operates under vibration conditions, an actuator on which a head is located may be caused to oscillate and, thus, the head may move farther distances away from a track center. Disk drives are typically designed to be able to handle a certain level of vibration so that they are still able to operate reliably under some vibration conditions.

A shock event differs from vibrations in that a shock is typically a one time external force that acts on a disk drive and causes a head to move far away from a track center. A shock may be caused by, for example, a strike on a disk drive, dropping a laptop in which a disk drive is located, and the like. When a shock occurs during a write operation, a head will typically be forced off-track, and there is a potential for an off-track write if the write operation is not disabled quickly.

In order to disable a write operation when a head is moved a certain distance away from a track center, a servo controller is typically designed to monitor a PES, and if the PES exceeds a write fault window (WFW), then the servo controller provides a signal to inhibit the write operation. The WFW, also known as an off-track threshold or write unsafe (WUS) limit, specifies a percentage (+/−) that if exceeded by a PES will cause a servo controller to provide a signal to disable a write operation.

The WFW has been traditionally set to a fixed value for all heads of all disk drives of a single family that are manufactured at a same time. One approach has been to experimentally determine an expected worst case off-track capability (OTC) of heads in the disk drives, where the worst case OTC represents a maximum off-track position at which the heads may still operate reliably. Then, the WFW would be set for all drives in the family based on the expected worst case OTC. The WFW in such an approach may be set to allow a write operation to continue during a vibration event that does not cause a head to move beyond a position specified by the worst case OTC.

Another approach to setting the WFW has been to determine an expected narrowest width of read elements of heads for all disk drives in a disk drive family. Then, the WFW for all disk drives in the family would be set based on the narrowest expected width of the read elements of the heads. For example, the WFW for all disk drives would be set to 50% of the width of the narrowest expected read element in order to prevent errors, such as sliver errors where old data remains and is read even when new data has been written to a track.

Recently, the related art has considered the possibility of setting the WFW for individual heads of individual disk drives instead of using a single WFW for all heads of all disk drives in an entire family of disk drives. Also, the related art has considered expanding the WFW from a default value. Such related art includes (1) U.S. Pat. No. 6,717,757 entitled "Variable Write Fault Protection Window"; (2) U.S. Pat. No. 6,714,372 entitled "Method of Manufacturing a Disk Drive by Measuring the Read Width in the Servo-Writer to Set the Write Unsafe Limit"; and (3) U.S. Pat. No. 6,795,262 entitled "Method of Modifying On-Track Declaration Algorithm of a Disk Drive Based Upon Detection of External Vibration Condition".

If a WFW is set to maximize disk drive capability based on a worst case OTC or based on a width of a narrowest expected read element of a head, then writing data when the WFW is exceeded by a PES may result in an off-track write or a potential sliver error because the head would have exceeded its capability. Such a setting of the WFW would be effective in preventing data errors if the PES were continuous. However, when using embedded servo sectors, the PES is not continuous. Rather, the PES consists of a number of discrete sample points that are generated when a head reads servo information from embedded servo sectors as a disk spins.

FIG. 1 is a graph illustrating how data integrity may be compromised if a WFW is set as in the related art. The curve in the graph of FIG. 1 represents a PES for a head with sample points $P_1$-$P_9$ at sample times $T_1$-$T_9$. The sample points $P_1$-$P_6$ reflect variations in the PES that may occur during normal track following operations due to, for example, internal factors as discussed above. At point $P_7$, the PES reflects that the head is moving farther away from track center. The movement may be due to, for example, a shock to the disk drive. At time $T_8$, the PES value $P_8$ reflects that the head has moved father away from track center, but writing is not yet disabled, because $P_8$ is still less than the WFW. Finally, at time $T_9$, the PES value $P_9$ has exceeded the WFW, so writing is disabled.

A problem with the related art can be seen in the example. As shown in the example, the PES would exceed the WFW sometime between time $T_8$ and time $T_9$, but writing is not disabled until time $T_9$, which creates the possibility for an off-track write. The delay in disabling writing occurs because the value of the PES is only known when samples are obtained during the time that the head reads servo information from the embedded servo sectors. When the head is writing data to data sectors, the head is said to be "flying blind" because no servo information is generated to correct a position of the head. In the example of FIG. 1, from the time after $T_8$ when the PES would exceed the WFW to the time $T_9$ when writing is disabled, the head may perform an off-track write or create the potential for a sliver error, because the WFW in the related art represents an expected limit of the capability of the head. As a result, data integrity may be compromised due to an off-track write or a potential sliver error when writing continues even when the head has moved to a position beyond the WFW.

One solution that has been proposed to detect an off-track write sooner is to increase a number of embedded servo sectors in each track. Increasing the number of embedded servo sectors in a track leads to an increase in a frequency at which sample are obtained for a PES and, thus, may allow for an off-track write to be detected sooner. However, increasing the number of embedded servo sectors is usually not desirable, because increasing the number of embedded servo sectors leaves less room on the disk for data sectors and, as a result, data storage capacity is reduced. Also, a higher sampling rate of a PES demands faster computation power, which may lead to an increase in manufacturing cost.

Another solution that has been proposed to detect an off-track write sooner is to include a hardware shock sensor in the disk drive. In such a configuration, when a signal from the hardware shock sensor exceeds a shock sensor threshold, writing is inhibited. The hardware shock sensor typically detects a shock event sooner than the shock can be detected using a PES and, thus, can reduce a probability of off-track write. However, including a hardware shock sensor in a disk drive has the disadvantage that manufacturing cost is increased due to a cost of the hardware shock sensor.

A further solution that has been proposed to detect an off-track write sooner is to calculate a predicted PES (P+V) from a known PES (P) and a velocity (V) and to compare the predicted PES with a PES Plus Velocity (PPV) threshold. A predicted PES may be calculated in different ways, and one way to calculate a predicted PES is disclosed in U.S. Pat. No. 6,496,315 entitled "Disk Drive with Off-Track Write Prevention", where a PES ($P_n$) and velocity ($V_n$=$P_n$−$P_{n-1}$) are calculated by reading data at an nth servo position, and a predicted PES is calculated as: predicted $PES_{n+1}$=$P_n$+$V_n$. A servo controller calculates the predicted PES and sends a signal to inhibit writing when the predicted PES exceeds the PPV threshold. Other methods of calculating a predicted PES are known in the art. The PPV threshold in the related art has typically been set to a fixed value that accounts for a worst case disturbance during which a disk drive may still operate reliably. Calculating a predicted PES requires more computation power and, thus, may increase the manufacturing cost of a disk drive.

In light of the above mentioned problems, there is a need to improve data integrity and disk drive reliability when a disk drive is subject to external forces, such as a shock. Also, there is a need to improve data integrity without decreasing a data storage capacity or increasing a manufacturing cost. Furthermore, there is a need to improve data integrity while not having a large detrimental impact on a data transfer rate.

SUMMARY OF THE DISCLOSURE

Embodiments of the present invention relate to magnetic storage systems and methods with tighter thresholds, such as a tighter write fault window (WFW) and a tighter PES Plus Velocity (PPV) threshold. In various embodiments, a threshold may be adjusted during a write operation to a default threshold or may be set based on a variance of a monitored value, such as a PES sample value, a predicted PES sample value, and the like. Such magnetic storage systems and methods may increase data integrity and reliability while not decreasing a data storage capacity or increasing a manufacturing cost. Also, because the thresholds may be adjusted, such magnetic storage systems and methods may be designed to not have a large detrimental impact on a data transfer rate.

A magnetic storage system according to a general embodiment of the present invention includes a disk, a head, an actuator, and a servo controller. A surface of the disk has a plurality of tracks for storing data. The head allows for reading data from and writing data to the disk, and the actuator allows for positioning the head over a selected track of the plurality of tracks of the disk. The servo controller monitors a value, such as a PES sample value, a predicted PES sample value, and the like, based on servo information provided by the head when the head reads data from embedded servo sectors of the selected track. The servo controller provides a signal to inhibit writing by the head based on a comparison of the monitored value with a threshold, such as a WFW, a PPV threshold, and the like.

In a first embodiment, a magnetic storage system includes a servo controller that sets a threshold to a first value based on at least one of an on-track track misregistration (TMR) value and a seek settle TMR value. The servo controller then determines whether or not a head is subject to a vibration condition. In the event that the servo controller determines that the head is subject to the vibration condition, the servo controller sets the threshold to a second value that is different from the first value, such as being greater than the first value.

In a second embodiment, a magnetic storage system includes a servo controller that determines a variance of a monitored value, such as a PES sample value, a predicted PES sample value, and the like. The servo controller may then set a threshold, such as a WFW, a PPV threshold, and the like, in real-time based on the determined variance of the monitored value. The servo controller may calculate a result of a mathematical function of the variance of the monitored value and dynamically set the threshold according to the result of the mathematical function.

In a third embodiment, a magnetic storage system includes a servo controller that sets a threshold to a first value. Then, in the event that the servo controller provides a first signal to inhibit a write operation by a head, the write operation is retried up to a specified number of times with the threshold set at the first value. In the event that the write operation is retried the specified number of times without success, the servo controller sets the threshold to a second value that is different from the first value, and the write operation is retried with the threshold set to the second value. Thus, the adjustment of the threshold may be performed during error-recovery time.

In some embodiments, a head of a magnetic storage system may comprise a read element for reading data from a disk and a write element for writing data to the disk. In various embodiments, a magnetic storage system includes a servo controller that can determine whether or not a head is subject to a vibration condition based on at least one of a PES variance, a throughput, a number of bump errors, a number of write retires, and a hardware shock sensor value. Also, in various embodiments, the threshold may be set to a first value during seek settle that is different from a second value that is set during normal track following operations. In addition, various embodiments may include a lookup table that permits for different thresholds to be set for different zones of a disk. It is also possible in some embodiments to apply a smaller WFW during sequential seek or other position mode seeks which traditionally have much less seek settle TMR than other seeks.

Therefore, embodiments of the present invention may enhance the reliability of a magnetic storage system, such as a disk drive, without adding extra cost. Also, embodiments of the present invention allow for dynamically adjusting a threshold during a vibration event so that a data transfer rate can be maintained when a head is subject to a vibration condition. Furthermore, embodiments of the present invention allow for adjusting a threshold during real-time operation or during error recovery time, which provides for additional design options.

DETAILED DESCRIPTION OF PREFERRED EMBODIMENTS

Figure 2:
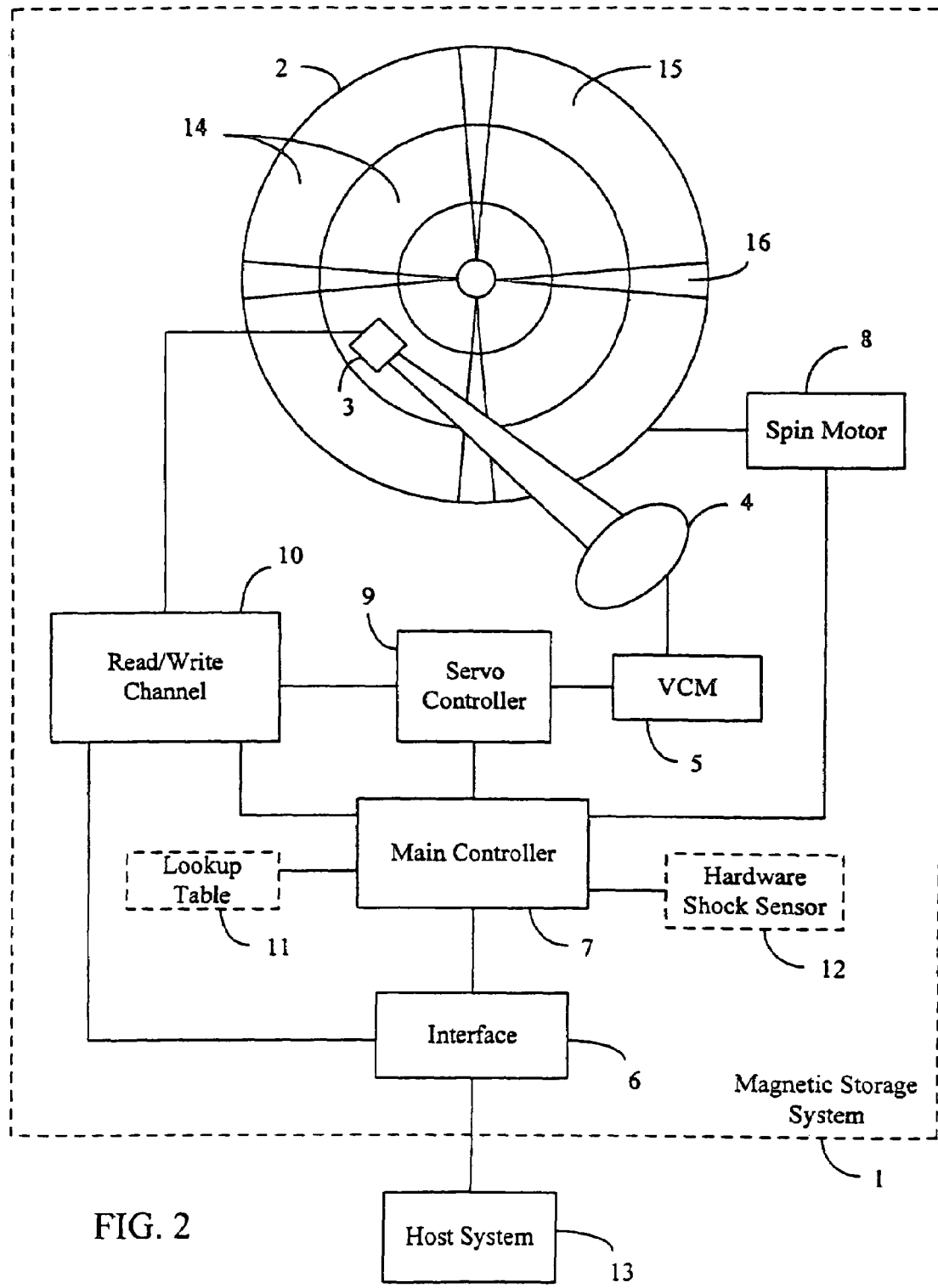
FIG. 2 illustrates a functional block diagram of a magnetic storage system of an embodiment of the present invention.

FIG. 2 illustrates a functional block diagram of a magnetic storage system 1 of an embodiment of the present invention.

The magnetic storage system 1 comprises a disk 2, a transducer or head 3, an actuator 4, a voice coil motor (VCM) 5, an interface 6, a main controller 7, a spin motor 8, a servo controller 9, and a read/write (r/w) channel 10. The magnetic storage system 1 may also comprise a lookup table 11 and a hardware shock sensor 12.

During operation, the disk 2 spins around a central axis, and the head 3 reads data from or writes data to a surface of the disk 2. The head 3 is supported on an arm of the actuator 4, and the VCM 5 rotates the actuator 4 about an axis in order to control a position of the head 3 over the disk 2.

The magnetic storage system 1 is not limited to having only a single disk 2, but may have a plurality of disks. Also, data may be written to both a top surface and a bottom surface of each disk, in which case a different head is required for each surface. The head 3 may have a single element for performing both reading and writing, or the head 3 may have separate elements for performing each of those operations, in which case the head 3 would comprise a read element and a write element. In addition, the head 3 may be connected to a secondary actuator located at an end of the arm of the actuator 4 for performing fine positioning of the head 3.

In the following discussion, the magnetic storage system 1 is described with reference to functional blocks and not discrete hardware elements. The functions may be implemented using one or more of hardware, software, and firmware. In addition, more than one function, or different parts of functions, may be combined in a given hardware, software, or firmware implementation.

When the magnetic storage system 1 is connected to a host system 13, the interface 6 communicates with the host system 13 to receive, for example, data and commands, and to send, for example, data and status identifiers. The interface 6 also communicates with the main controller 7 and the r/w channel 10 to send and receive, for example, data and commands. When the main controller 7 receives a command from the interface 6 for a read or a write operation, the main controller 7 provides a signal to the spin motor 8 to cause the disk 2 to spin.

As shown in FIG. 2, the disk 2 has a plurality of tracks 14 for storing data. Each of the tracks 14 has a plurality of data sectors 15 and a plurality of embedded servo sectors 16. When performing a read or a write operation, the main controller 7 sends a signal that contains information about a selected track to the servo controller 9. The servo controller 9 then provides a positioning signal to the VCM 5, and the VCM 5 rotates the actuator 4 according to the positioning signal in order to position the head 3 over the selected track. The head 3 reads data from embedded servo sectors of the selected track and provides the data read from the embedded servo sectors as servo information to the r/w channel 10, and the r/w channel 10 then provides the servo information to the servo controller 9. The head 3 may have a separate element for reading embedded servo data from the disk 2, but a separate element is not required.

The servo controller 9 receives the servo information provided by the r/w channel 10 and determines a position error signal (PES) from the servo information. The PES is a signal that is indicative of a position of the head 3 relative to a center of the selected track. The PES is usually specified in terms of a percentage (+/−) that a center of the head 3 is away from the center of the selected track. The servo controller 9 then sends a positioning signal to the VCM 5 to reposition the actuator 4 based on the PES so that the head 3 is moved toward the center of the selected track.

When the servo controller 9 determines that the head 3 is positioned over the selected track, the servo controller 9 sends a signal to the r/w channel 10 to allow for the start of a read or a write operation. It is also possible that the servo controller 9 sends the signal to the main controller 7 rather than to the r/w channel 10, in which case the main controller 7 would then send the signal to the r/w channel 10. The r/w channel 10 also receives a command from the main controller 7 that specifies the type of operation to be performed. In the case of a read operation, the r/w channel 10 causes the head 3 to read the data and then sends the data to either the interface 6 or the main controller 7. In the case of a write operation, the r/w channel 10 receives data from either the interface 6 or the main controller 7 and causes the head 3 to write the data.

During a write operation, the servo controller 9 monitors the PES, and if the PES exceeds a write fault window (WFW), then the servo controller 9 provides a signal to the r/w channel 10 or the main controller 7 to inhibit the write operation. Thus, the WFW specifies a percentage (+/−), which if exceeded by the PES will cause the servo controller 9 to provide the signal to inhibit or disable the write operation. The WFW is also known as an off-track threshold or a write unsafe (WUS) limit. Similarly, the servo controller 9 may monitor a predicted PES, and if the predicted PES exceeds a PES plus Velocity (PPV) threshold, then the servo controller 9 provides a signal to the r/w channel 10 or the main controller 7 to inhibit the write operation.

The servo controller 9 of the magnetic storage system 1 can set a threshold, such as a WFW, a PPV threshold, and the like, to a default threshold or to a tighter threshold. The default threshold may be determined to be as wide as possible while a read/write performance of the head 3 and a reliability target is still achieved under vibration conditions. For example, the default threshold may be based on an off-track capability (OTC) of the head 3 that relates to the ability of the head 3 to operate reliably in an off-track position or may be based on a width of a read element of the head 3. The default threshold may also be based on a super-imposition of an on-track track misregistration (TMR) value of the head 3, a seek settle TMR value of the head 3, an ability of the head 3 to operate under vibration conditions, and a r/w capability of the head 3.

The tighter threshold may be defined based on the on-track TMR value of the head 3 and the seek settle TMR of the head 3. For example, the tighter threshold may be defined as the on-track TMR value plus some margin or the seek settle TMR value plus some margin. The tighter threshold may be set so that a throughput requirement is met when the magnetic storage system 1 is not operating under vibration conditions. Also, the tighter threshold may be optimized during a self-test of the magnetic storage system 1, and may be optimized for a particular disk surface and head, or even for particular zones of the disk.

If the tighter threshold is optimized for particular zones of the disk, then the lookup table 11 may be used to store the tighter threshold values for each zone. The main controller 7 may then use the lookup table 11 when issuing a write operation in order to obtain a tighter threshold value based on a target zone of the write operation. The main controller 7 may then send the tighter threshold value to the servo controller 9 so that the servo controller 9 could set the tighter threshold based on the zone of the write operation.

Figure 3:
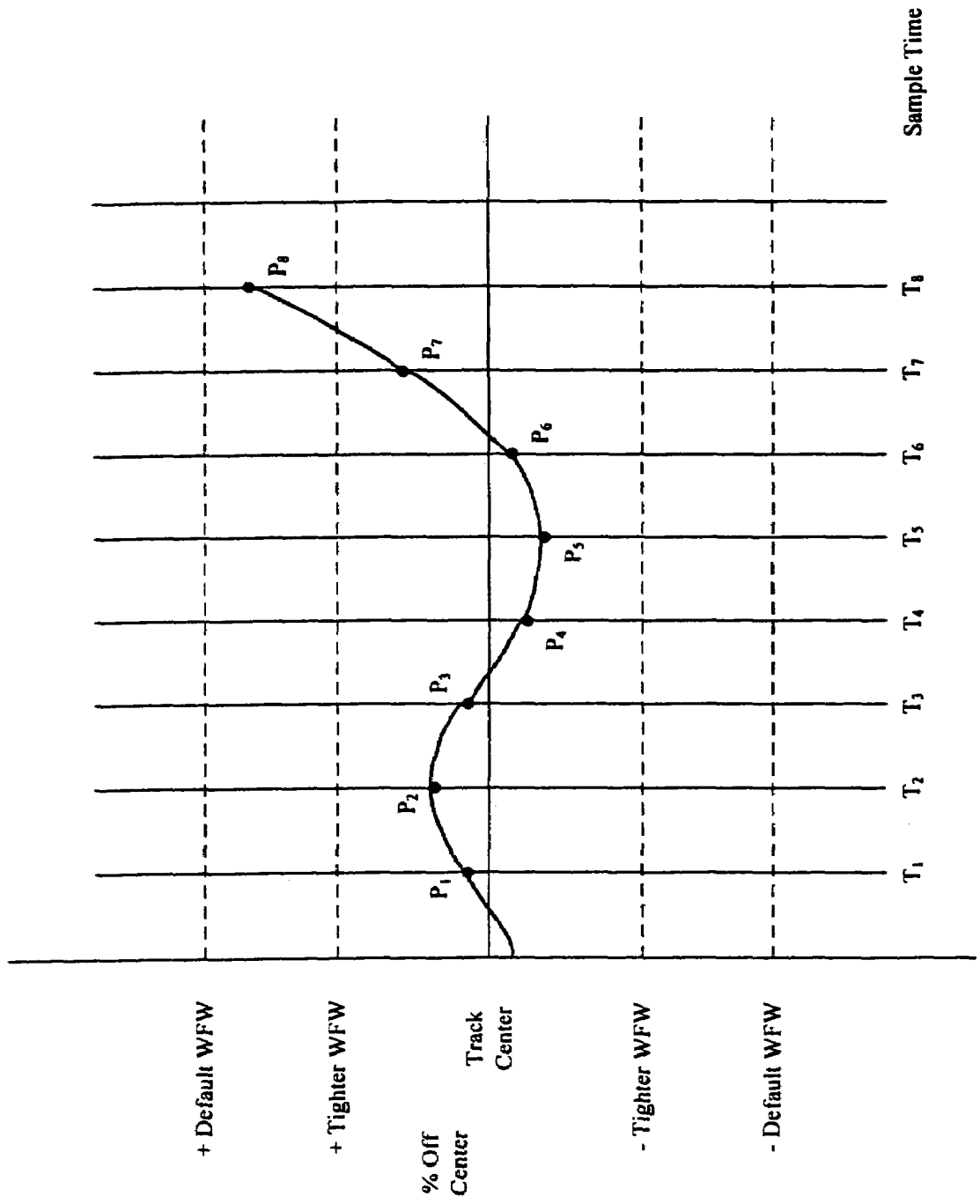
FIG. 3 illustrates an example that demonstrates an advantage of having a tighter write fault window.

FIG. 3 illustrates an example that demonstrates an advantage of having a tighter WFW. The curve in the graph of FIG. 3 represents an example PES for the head 3 during a write operation, with sample points $P_1$-$P_8$ at sample times $T_1$-$T_8$. The sample points $P_1$-$P_6$ reflect variations in the PES that may occur during normal track following operations due to, for example, internal factors. At point $P_7$, the PES reflects that the head 3 is moving farther away from track center. The movement may be due to, for example, a shock to the magnetic storage system 1. At time $T_8$, the PES value $P_8$ reflects that the head has moved father away from track center, and writing by the head 3 is disabled, because $P_8$ exceeds the tighter WFW.

Figure 1:
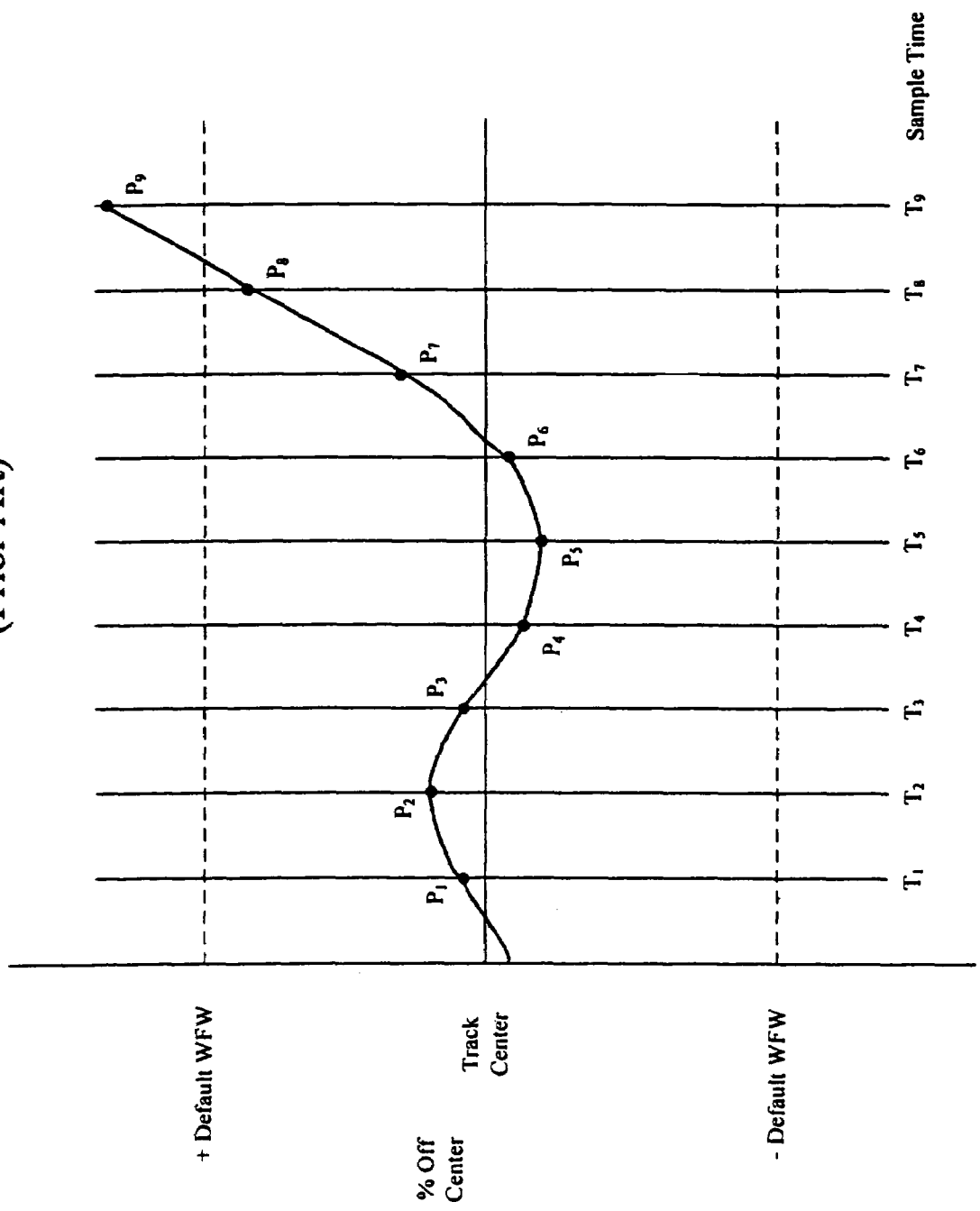
FIG. 1 is a graph illustrating how data integrity may be compromised if a write fault window is set as in the related art.

A comparison of the example of FIG. 3 with the example of FIG. 1, demonstrates that setting a tighter WFW may allow for writing to be disabled sooner when a shock event occurs. The PES sample values in FIG. 3 did not exceed the default WFW and, as a result, a probability of an off-track write or potential for a sliver error are reduced as compared with the example of FIG. 1. Thus, setting a tighter WFW may enhance data integrity by detecting a potential off-track write sooner so that writing by the head 3 may be disabled before the off-track write occurs.

Although setting a threshold to a tighter threshold value may enhance data integrity, a tighter threshold may not allow for some write operations to occur under vibration conditions, even when the write operations could be successfully completed. As a result, if a threshold is kept constant at a tighter threshold value based on an on-track TMR value or a seek settle TMR value, a data transfer rate of the magnetic storage system 1 may be reduced. In order to allow for write operations to occur when the head 3 is subject to vibration conditions, the servo controller 9 of the magnetic storage system 1 may determine when the head 3 is subject to vibration conditions and adjust the threshold to a higher default threshold value when the head 3 is subject to the vibration conditions.

Figure 4:
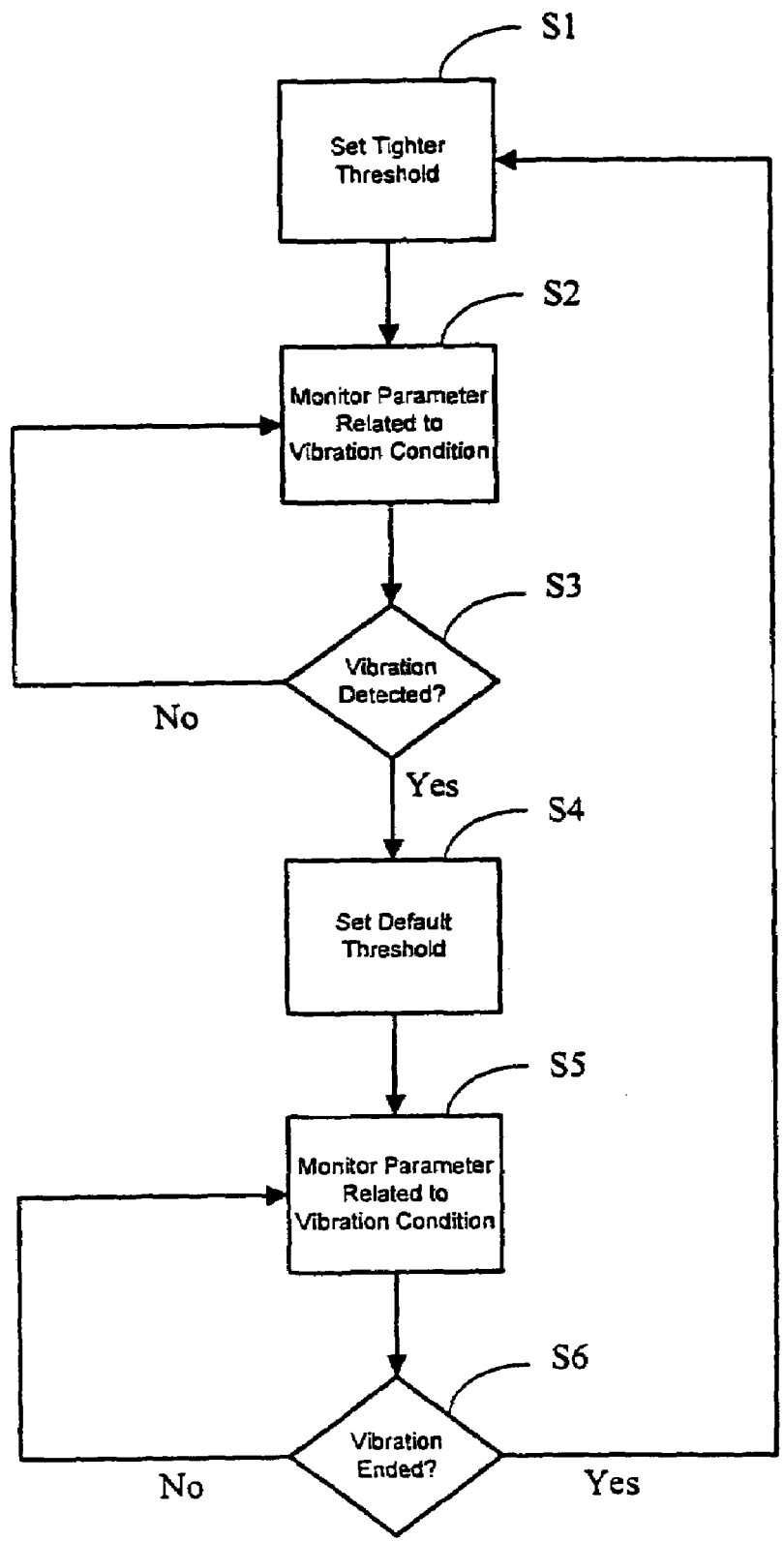
FIG. 4 shows a flowchart of a process that may be carried out by a servo controller of a magnetic storage system in accordance with an embodiment of the present invention during write operations.

FIG. 4 shows a flowchart of a process that may be carried out by the servo controller 9 during write operations. In S1, the servo controller 9 sets a threshold, such as a WFW, a PPV threshold, and the like, to a tighter threshold value and the process continues to S2. The tighter threshold is set based on at least one of an on-track TMR value and a seek settle TMR value. In S2, the servo controller 9 monitors a parameter that can provide information about a vibration condition. In various embodiments, the monitored parameter may be an output of a software vibration detector implemented in firmware that detects a vibration based on at least one of a PES variance, a measured throughput, a measured number of bump errors, and the like. In various other embodiments, the monitored parameter may also be an output of a hardware vibration detector, such as a hardware shock sensor, a sensor located on an arm of the actuator 4, and the like. When the magnetic storage system 1 operates under vibration conditions, the software vibration detector, or hardware vibration detector if present, are triggered to signal that a vibration event is occurring. The process then continues to S3.

In S3, the servo controller 9 determines based on the monitored parameter whether the head 3 is subject to a vibration condition. If the determination in S3 is that the head 3 is not subject to a vibration condition, then the process returns to S2 and the servo controller 9 again monitors the parameter. If the determination in S3 is that the head 3 is subject to a vibration condition, then the threshold is set to a default threshold in S4, and the process continues to S5.

In S5, the servo controller 9 monitors a parameter that can provide information about an end of the vibration condition, such as, for example, monitoring an output of a software vibration detector or a hardware vibration detector. The process then continues to S6. In S6, the servo controller 9 determines based on the monitored parameter whether the vibration condition has ended. If the determination in S6 is that the vibration condition has not ended, then the process returns to S5 and the servo controller 9 again monitors the parameter. On the other hand, if the determination in S6 is that the vibration condition has ended, then the process returns to S1 and the threshold is set to the tighter threshold.

The process of FIG. 4 ends when either the write operation has been completed successfully, or when the threshold is exceeded by a monitored value. If the threshold is a WFW, then the monitored value may be, for example, a PES sample value. A PES sample value is a value of a PES that is calculated by, for example, the servo controller 9 when the head 3 reads data from an embedded servo sector and the data is provided as servo information to the servo controller 9. If the threshold is a PPV threshold, then the monitored value may be, for example, a predicted PES sample value. A predicted PES sample value is a value of a predicted PES that is calculated by, for example, the servo controller 9 when the head 3 reads data from an embedded servo sector and the data is provided as servo information to the servo controller 9.

Figure 5:
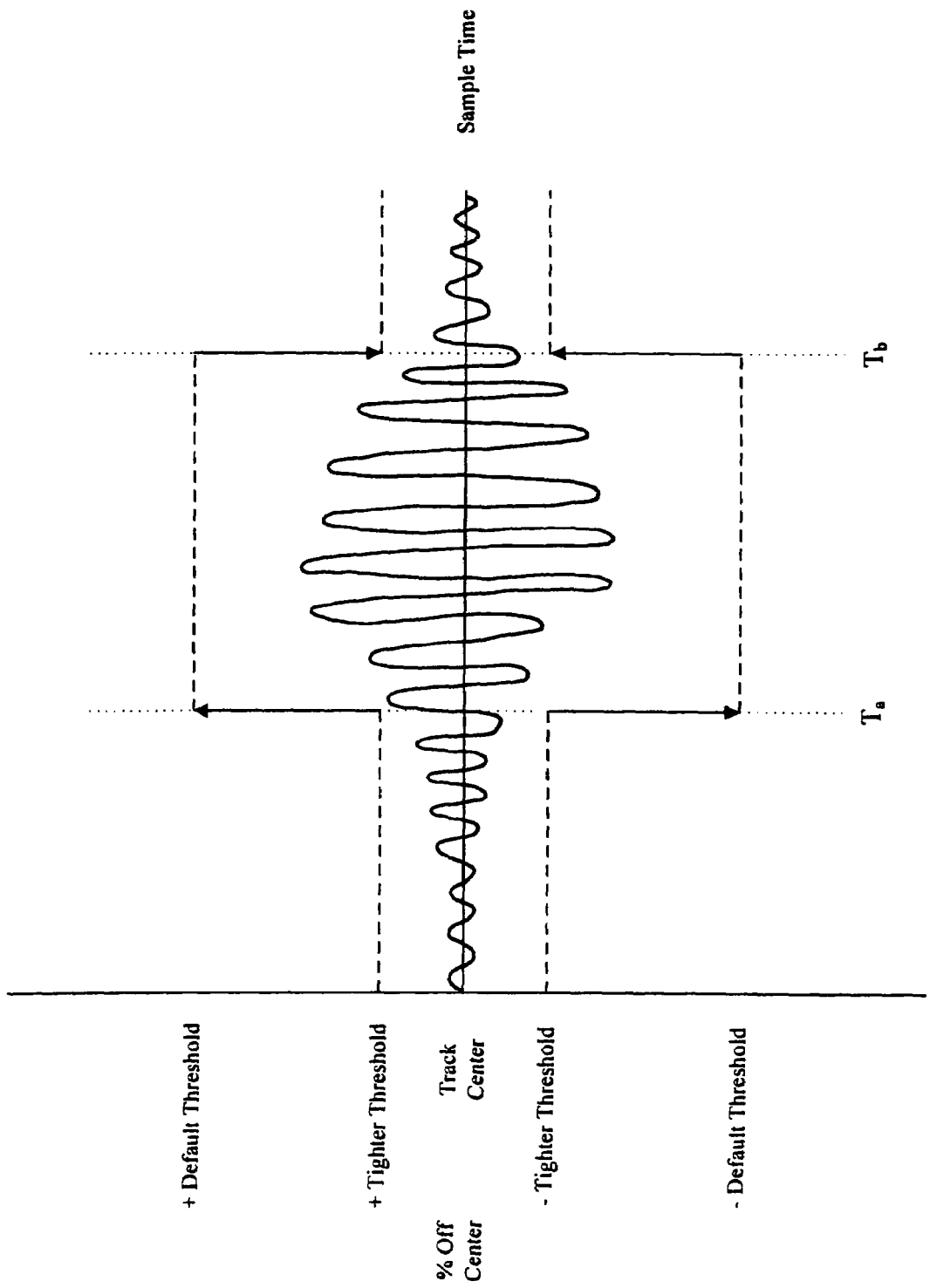
FIG. 5 illustrates an example of a setting of a threshold according to the process of FIG. 4.

FIG. 5 illustrates an example of a setting of a threshold according to the process of FIG. 4. In FIG. 5, the horizontal axis of the graph represents sample time and the vertical axis represents a percentage off of a center of a track. The curve represents a value of a monitored value, such as a PES sample value, a predicted PES sample value, and the like. The curve is shown as being continuous, but it should be appreciated that the curve may actually be comprised of a number of discrete sample points such as would be obtained by reading data from embedded servo sectors. As shown in FIG. 5, the threshold is first set to a tighter threshold. The threshold may be, for example, a WFW, a PPV threshold, and the like. When a vibration condition is detected at time $T_a$, the threshold is set to the default threshold and a write operation is allowed to continue under the vibration condition. At time $T_b$, the end of the vibration condition is detected, and the threshold is again set to the tighter threshold.

In accordance with the process shown in FIG. 4 and the example of FIG. 5, the servo controller 9 sets a threshold to a tighter threshold value when the magnetic storage system 1 operates under vibration free conditions. The servo controller 9 then determines whether or not the head 3 of the magnetic storage system 1 is subject to a vibration condition and, when the head 3 is subject to a vibration condition, sets the threshold to a default threshold that is different from the tighter threshold by, for example, being larger than the tighter threshold. When the vibration condition has ended, the servo controller 9 sets the threshold back to the tighter threshold value. By keeping the threshold at the tighter threshold value under vibration free conditions, a potential off-track write due to a shock event may be detected sooner, and writing may be disabled sooner so that data integrity may be enhanced. Also, by adjusting the threshold when the magnetic storage system 1 is subject to a vibration condition, a write operation is allowed to continue during the vibration, and the data transfer rate may not be detrimentally impacted in a large manner.

In various embodiments, a threshold of the magnetic storage system 1 may be set based on an on-track TMR value and a seek settle TMR value during either seek or seek settle. Then, once the head 3 has settled on a track and, for example, a certain number of sectors have passed after the on-track is declared, the threshold may be set purely based on the on-track TMR value. Such a setting of the threshold would further tighten up the threshold, such as a WFW, a PPV threshold, and the like. In various other embodiments, a smaller threshold may be applied during sequential seek or other position mode seeks, which traditionally have much less seek settle TMR, in order to further tighten the threshold.

Figure 6:
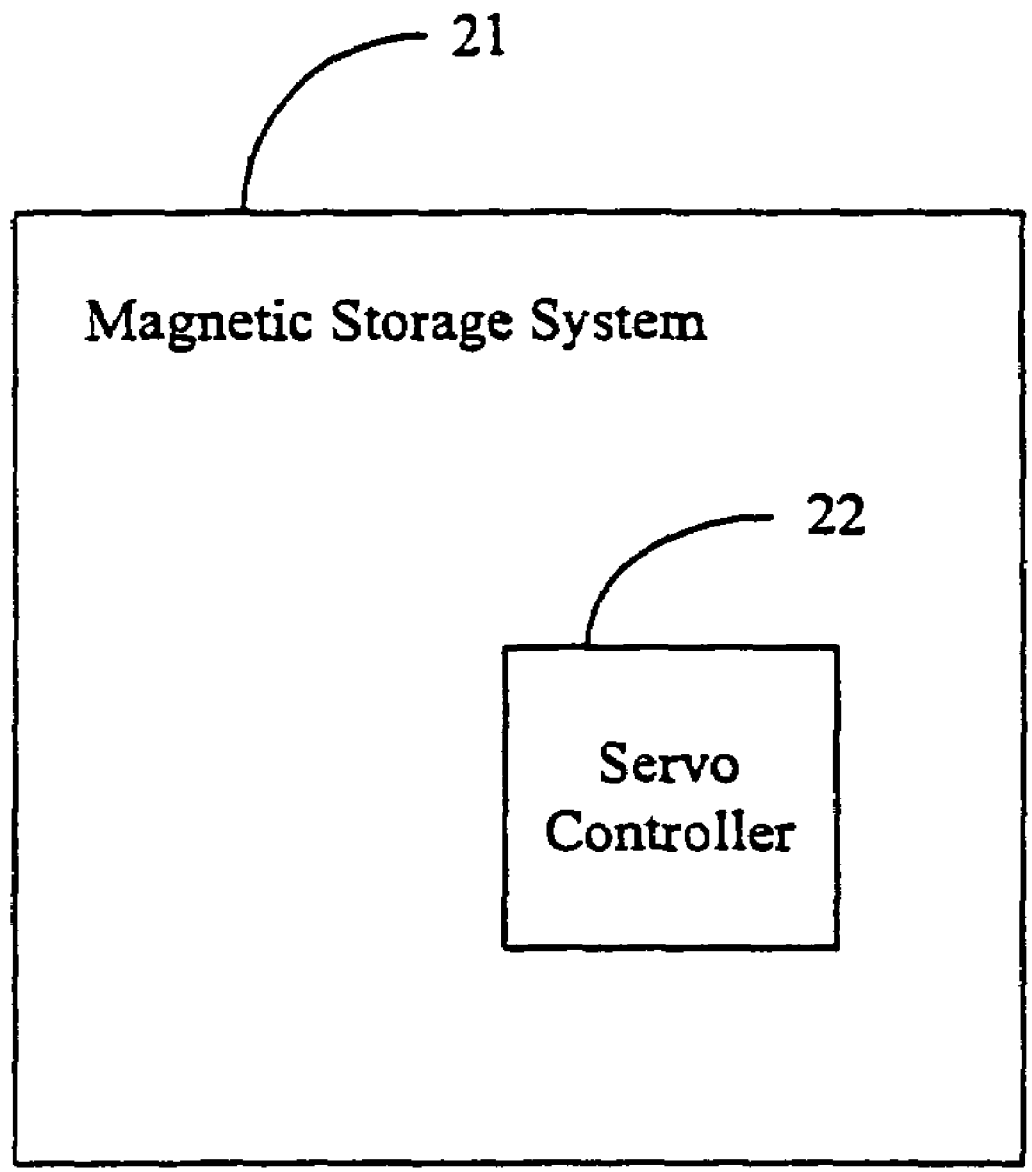
FIG. 6 illustrates a block diagram of a magnetic storage system of another embodiment of the present invention.

FIG. 6 illustrates a block diagram of a magnetic storage system 21 of another embodiment of the present invention. The magnetic storage system 21 is similar to the magnetic storage system 1, but the magnetic storage system 21 comprises the servo controller 22 rather than the servo controller 9.

The servo controller 22 of the magnetic storage system 21 monitors a PES variance in real time and sets a threshold, such as a WFW, a PPV threshold, and the like, according to the measured PES variance value. The PES variance may be determined, for example, by maintaining a buffer that holds the "x" most recent PES sample values, where "x" is an integer value. A sample mean could then be calculated from the "x" PES sample vales, and the sample variance could then be determined according to a mathematical variance calculation.

The servo controller 22 may set a threshold according to a function of the measured PES variance. If T is a threshold, v is a measured PES variance, n is a real variable, and m is a real variable, then an example of a function for setting the threshold may be stated as:

$$T=(\sqrt{v})*n+m \quad \text{(Equation 1)}$$

In practice, any suitable function or equation of the PES variance may be used. However, if PES sample values are assumed to be approximated by a normal distribution, then the function of Equation 1 may provide for a favorable setting of the threshold, because if PES sample values are assumed to follow a normal distribution, "n" is set to 3 in Equation 1, and "m" is set to 0, then there is approximately a 99.7% probability that the PES sample values will fall within the threshold. If a PES sample value exceeds a threshold that is calculated in such as manner, then there is a high probability that a shock event has occurred that has caused a head of the magnetic storage system 21 to move father away from track center, and the potential off-track write may be detected sooner due to the setting of the threshold.

Figure 7:
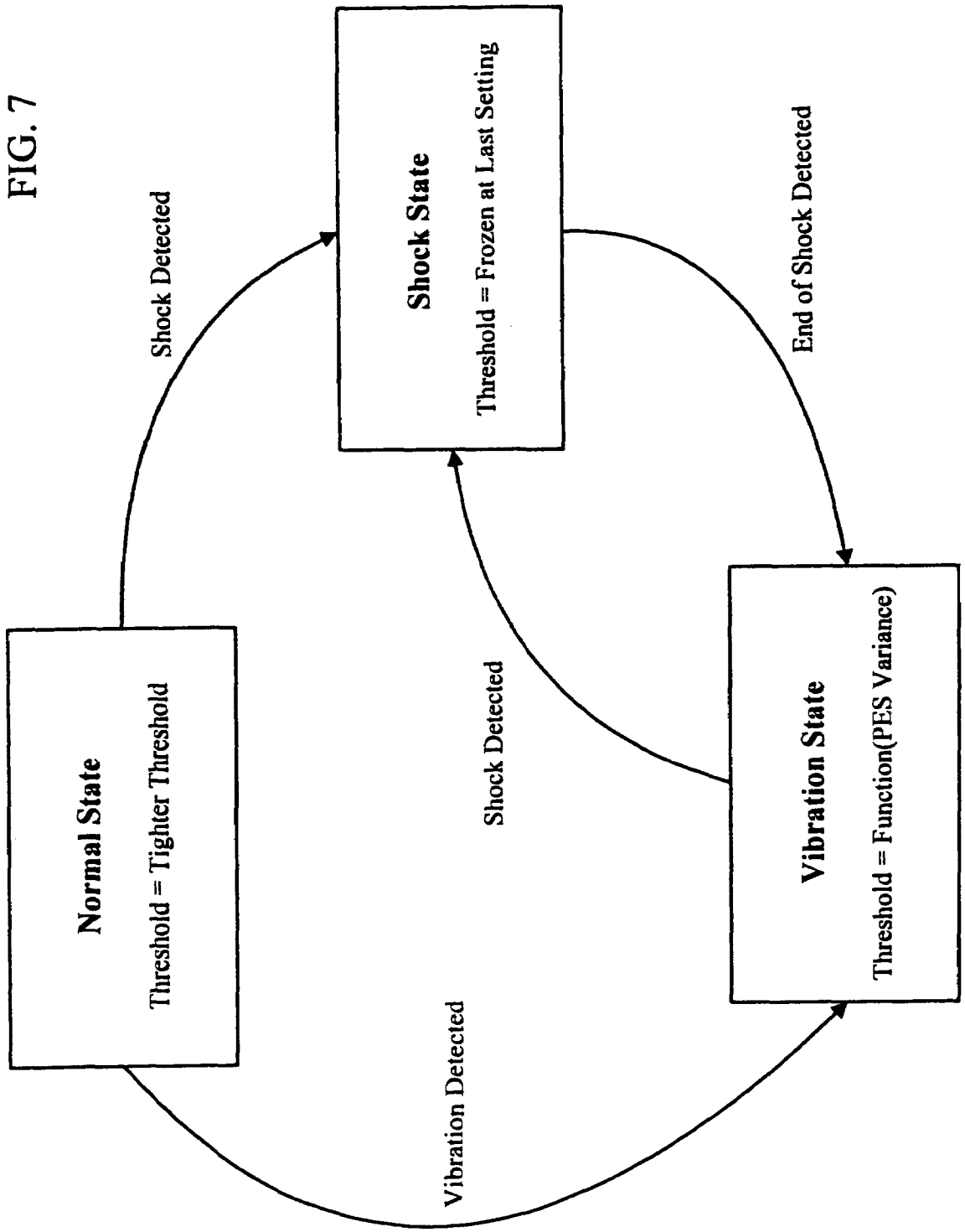
FIG. 7 shows a statechart that depicts an example process that can be performed by a servo controller of a magnetic storage system in accordance with an embodiment of the present invention.

FIG. 7 shows a statechart that depicts an example process that can be performed by the servo controller 22. In the statechart, the normal state represents a state in which the magnetic storage system 21 is not subject to vibration or shock, and is the initial state in the process. In the normal state, the threshold is set to a tighter threshold that is based on, for example, at least one of an on-track TMR value and a seek settle TMR value. In the normal state, when a vibration is detected, the state is transitioned to the vibration state. A head may be determined to be subject to a vibration condition based on, for example, a PES variance being high, a drop in throughput, a number of bump errors increasing, a number of retries increasing, and the like.

In the vibration state, the threshold is set based on the measured PES variance. The threshold in the vibration state may be set according to a function of the PES variance, such as, for example, according to the mathematical function shown in Equation 1. In the vibration state, when a shock is detected, the last setting of the threshold may be frozen and carried over into the shock state. Similarly, when the shock state is entered from the normal state due to a shock being detected, the threshold may be kept frozen at the tighter threshold setting. Once in the shock state, the process will return to the vibration state once the shock has ended.

In various embodiments, the normal state may be entered from the vibration state when an end of the vibration condition is detected. In various other embodiments, the threshold in the vibration state is set according to a function of the PES variance until the threshold reaches a default threshold value, at which time the threshold is not allowed to go above the default threshold. In some embodiments, the threshold in the shock state may be set to the default threshold. Also, it is possible that the shock state is entered if the recorded PES has consecutive large maximum and minimum values, for example, values that are over 50% of the track width.

Figure 8:
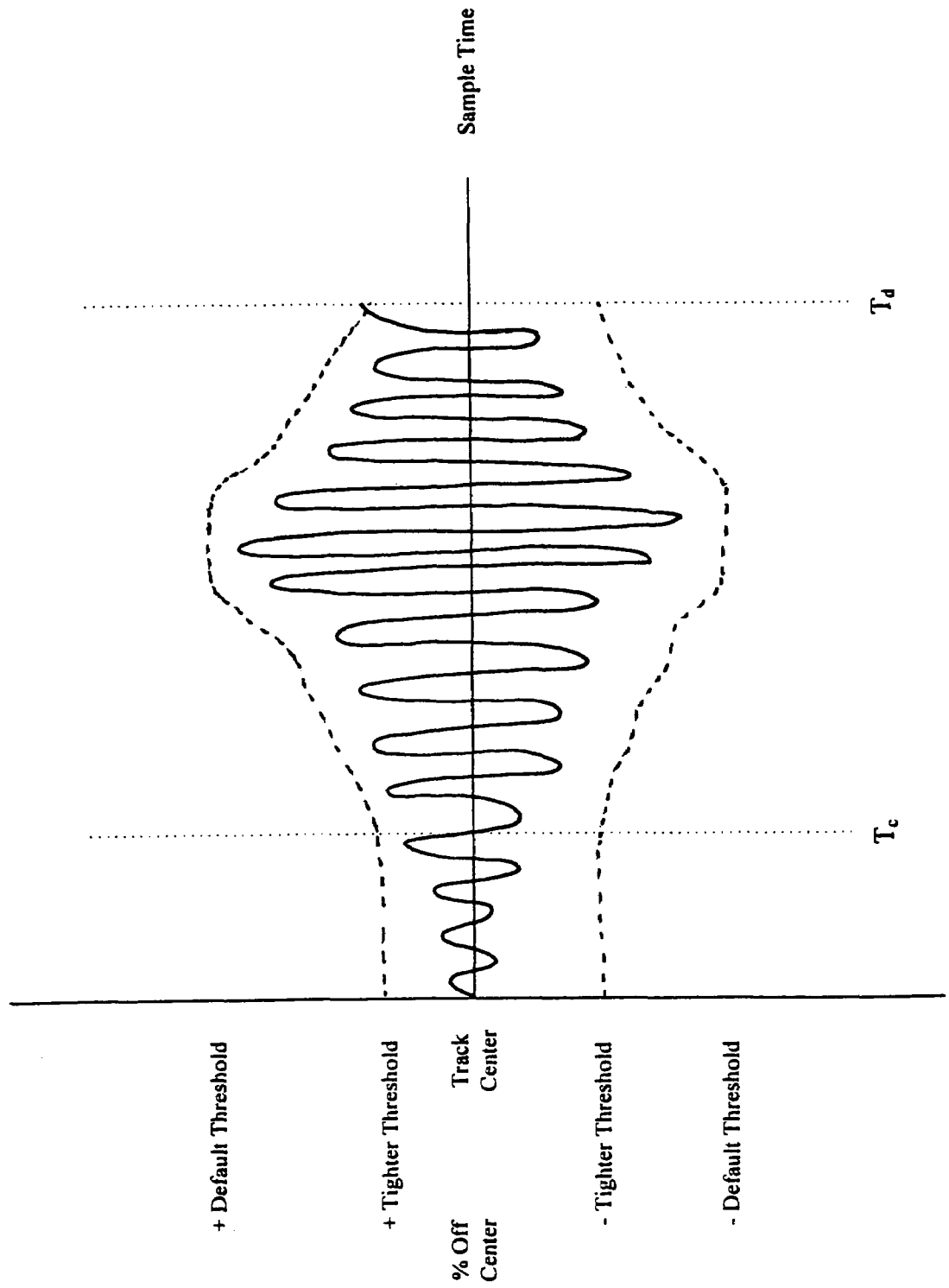
FIG. 8 shows an example of a threshold being set according to the process of FIG. 7.

FIG. 8 shows an example of a threshold being set according to the process of FIG. 7. In FIG. 8, the horizontal axis of the graph represents sample time and the vertical axis represents a percentage off of a center of a track. The curve represents a value of a monitored value, such as a PES sample value, a predicted PES sample value, and the like. The curve is shown as being continuous, but it should be appreciated that the curve may actually be comprised of a number of discrete sample points such as would be obtained by reading data from embedded servo sectors. As shown in FIG. 8, the threshold is first set to a tighter threshold. The threshold may be, for example, a WFW, a PPV threshold, and the like. When a vibration condition is detected at time $T_c$, the threshold is set based on a measured PES variance, but is not allowed to be set above the default threshold. At time $T_d$, a shock occurs, and writing is disabled when the monitored value exceeds the threshold.

In accordance with the process shown in FIG. 7 and the example of FIG. 8, the servo controller 22 sets a threshold to a tighter threshold value when the magnetic storage system 21 operates under vibration free conditions. The servo controller 9 then determines when the magnetic storage system 21 is subject to a vibration condition and sets the threshold according to a PES variance when the vibration condition is detected. By setting the threshold according to a monitored PES variance, a potential off-track write due to a shock event may be detected sooner, and writing may be disabled sooner so that data integrity may be enhanced. Also, by adjusting the threshold when the magnetic storage system 21 is subject to a vibration condition, a write operation is allowed to continue during the vibration, and the data transfer rate may not be detrimentally impacted in a large manner.

Figure 9:
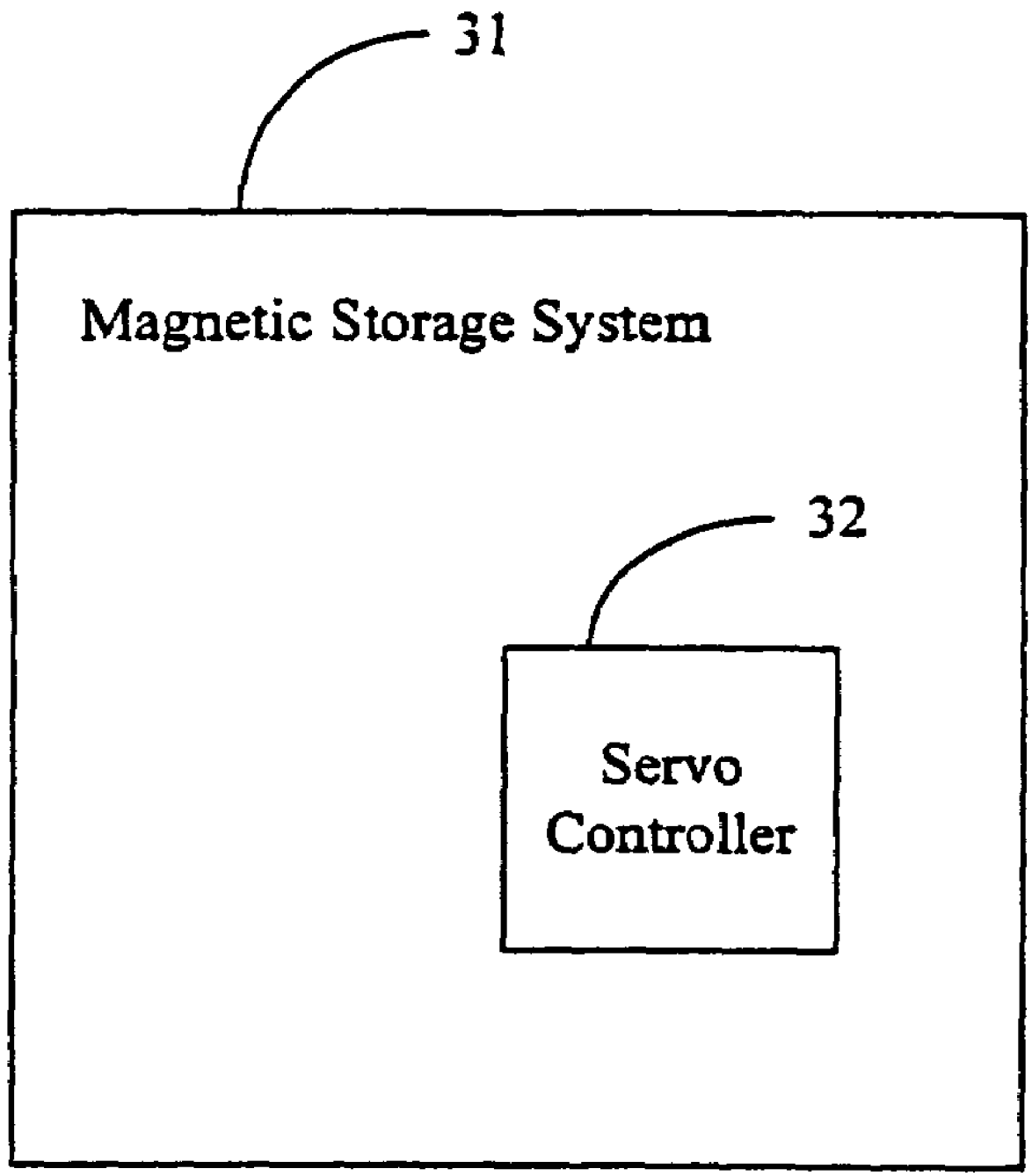
FIG. 9 illustrates a block diagram of a magnetic storage system of another embodiment of the present invention.

FIG. 9 illustrates a block diagram of a magnetic storage system 31 of another embodiment of the present invention. The magnetic storage system 31 is similar to the magnetic storage system 1, but the magnetic storage system 31 comprises the servo controller 32 rather than the servo controller 9.

The servo controller 32 permits for changing a threshold, such as a WFW, a PPV threshold, and the like, during an error recovery time after the threshold has been exceeded by a monitored value, such as a PES sample value, a predicted PES sample value, and the like. The servo controller 32 may change the threshold during write retries. For example, the first "$N_{max}$" attempts to write data may be done with a tighter threshold based on, for example, at least one of an on-track TMR value and a seek settle TMR value. In such an instance, "$N_{max}$" represents a maximum number of write retries that are attempted with the tighter threshold. If the write operation is not successful after "$N_{max}$" attempts, then subsequent attempts to write the data may be done with a default threshold.

Figure 10:
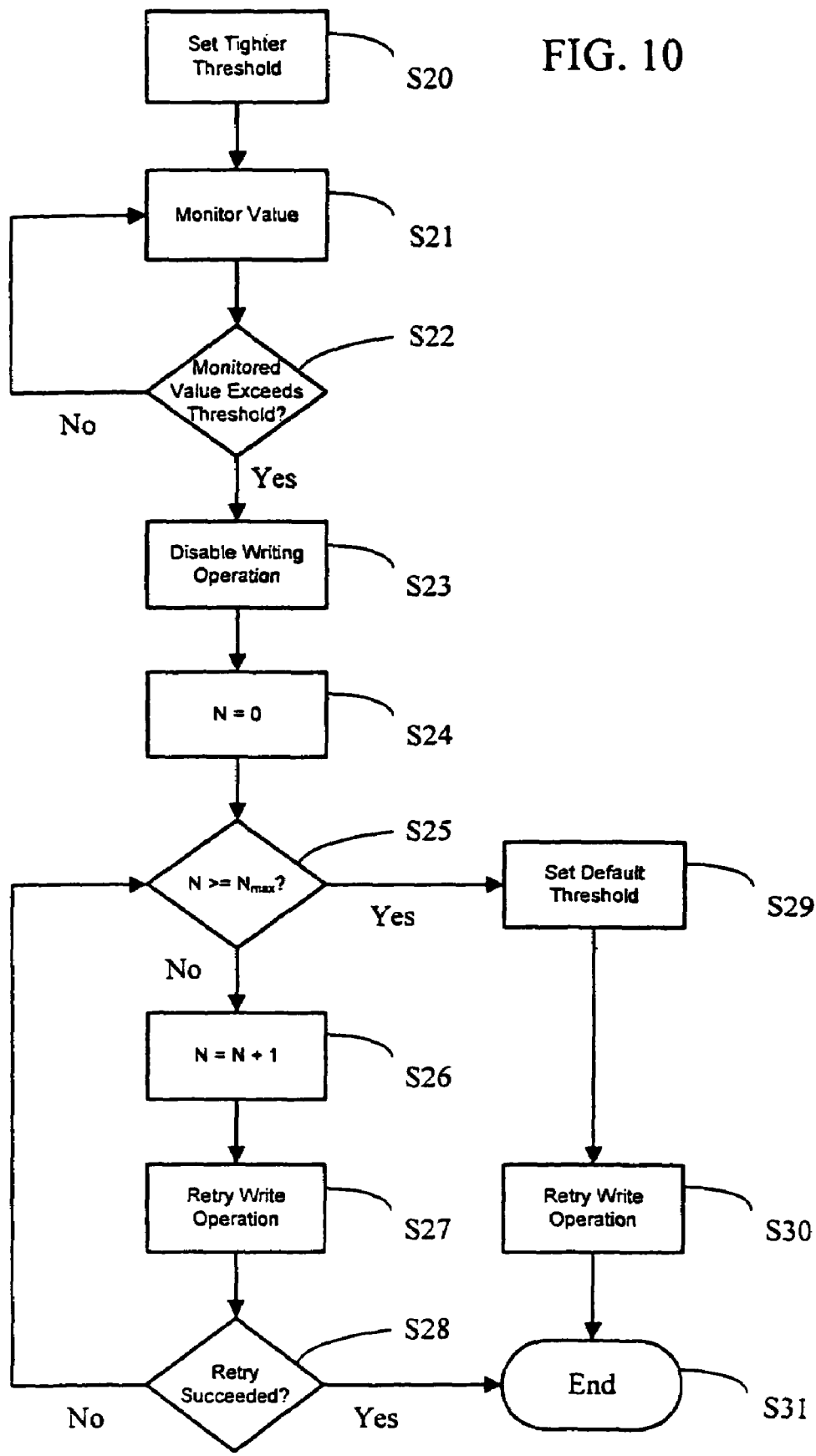
FIG. 10 shows a flowchart of a process that may be carried out by a servo controller of a magnetic storage system in accordance with an embodiment of the present invention.

FIG. 10 shows a flowchart of a process that may be carried out by the servo controller 32. When a write operation is instructed, in S20 the servo controller 32 sets a threshold, such as a WFW, a PPV threshold, and the like, to a tighter threshold based on, for example, at least one of an on-track TMR value and a seek settle TMR value. The process then continues to S21. In S21, the servo controller 32 monitors a value, such as a PES sample value, a predicted PES sample value, and the like, and the process continues to S22. In S22, the servo controller 32 determines whether or not the monitored value exceeds the threshold. If it is determined in S22 that the monitored value does not exceed the threshold, then the process returns to S21 and the servo controller 32 again monitors the value.

On the other hand, if it is determined in S22 that the monitored value does exceed the threshold, then the process continues to S23. In S23, the servo controller sends a signal to disable the writing operation, and the process continues to S24. In S24, a value "N" is set to 0 where N represents a number of write retries that have been performed with a tighter threshold, and the process continues to S25. In S25, it is determined whether or not "N" is greater than or equal to "$N_{max}$", where "$N_{max}$" is a maximum number of write retries that may be performed with the tighter threshold.

If it is determined in S25 that "N" is not greater than or equal to "$N_{max}$", then the process continues to S26 where "N" is incremented by one, and then continues to S27 where the write operation is retired with the tighter threshold. After retrying the write operation in S27, the process continues to S28 where it is determined whether or not the write retry succeeded. If it is determined in S28 that the retry did not succeed, then the process returns to S25 and "N" is again compared with "$N_{max}$". If it is determined in S28 that the retry did succeed, then the process ends in S31.

If it is determined in S25 that "N" is greater than or equal to "$N_{max}$", then in S29 the threshold is set to the default threshold. The process then continues to S30 where the write operation is retried with the default threshold and then the process ends in S31.

Figure 11:
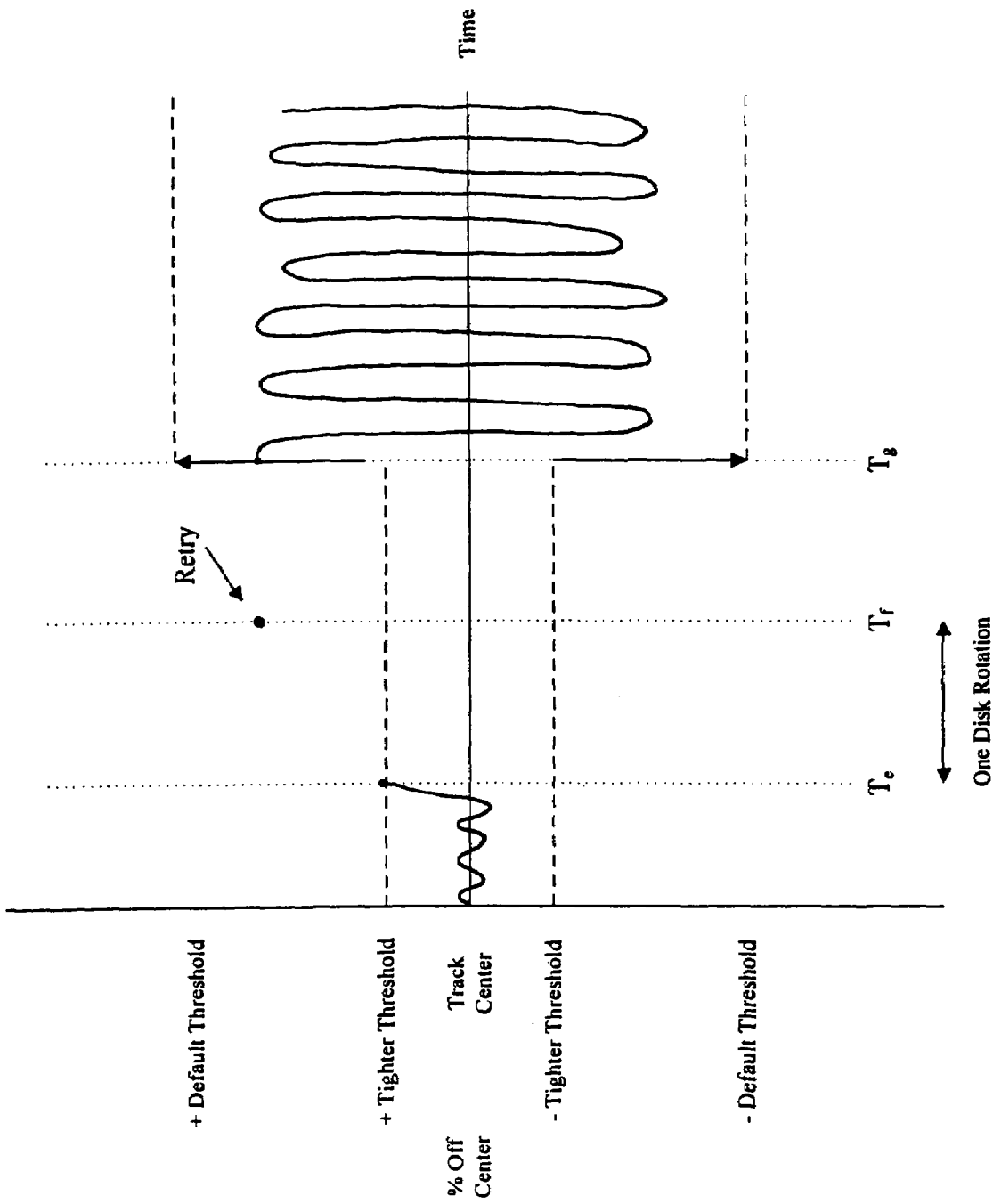
FIG. 11 illustrates an example of setting a threshold according to the process of FIG. 10.

FIG. 11 illustrates an example of setting a threshold according to the process of FIG. 10. In FIG. 11, the horizontal axis of the graph represents time and the vertical axis represents a percentage off of a center of a track. The curve represents a value of a monitored value, such as a PES sample value, a predicted PES sample value, and the like. The curve is shown as being continuous during writing, but it should be appreciated that the curve may actually be comprised of a number of discrete sample points such as would be obtained by reading data from embedded servo sectors. As shown in FIG. 11, the threshold is first set to a tighter threshold. The threshold may be, for example, a WFW, a PPV threshold, and the like. At time $T_e$, the monitored value exceeds the threshold due to, for example, a vibration or shock.

In the example of FIG. 11, "$N_{max}$" is set to 1. Thus, the write operation may be retried a maximum of one time at the tighter threshold. At time $T_f$, the write operation is retried at the tighter threshold, but the monitored value still exceeds the tighter threshold, so the retry fails. The write retry at time $T_f$ may occur, for example, one disk rotation after the write operation failed at time $T_e$. After the first write retry, the number of retries with the tighter threshold is equal to one, which is greater than or equal to "$N_{max}$" in the example, so the write operation is then retried with the default threshold. As shown in FIG. 11, at time $T_g$, the write is retried with the default threshold and is successful.

In accordance with the process shown in FIG. 10 and the example of FIG. 11, the servo controller 32 sets a threshold to a tighter threshold value during a write operation. If a monitored value exceeds the threshold, then the write operation is inhibited, and is retried up to a specified number of times with the tighter threshold. If the write operation is not successful after the specified number of write retries with the tighter threshold, then the write operation is retried with a default threshold. Thus, the threshold can be changed during error recovery time. By keeping the threshold initially at a tighter threshold value, a potential off-track write may be detected sooner and writing may be disabled sooner when there is a potential off-track write, so that data integrity may be enhanced. Also, by adjusting the threshold to a default threshold after a specified number of unsuccessful write retries with the tighter threshold, write operations are allowed to continue under some vibration conditions so that a data transfer rate may not be detrimentally impacted in a large manner.

The embodiments disclosed herein are to be considered in all respects as illustrative, and not restrictive of the invention. The present invention is in no way limited to the embodiments described above. Various modifications and changes may be made to the embodiments without departing from the spirit and scope of the invention. The scope of the invention is indicated by the attached claims, rather than the embodiments. Various modifications and changes that come within the meaning and range of equivalency of the claims are intended to be within the scope of the invention.

What is claimed is:

1. A storage system, comprising:
a head for reading data from a disk and for writing data to the disk, the disk having a surface with one or more tracks for storing data; and
a servo controller for obtaining a plurality of values that are based on servo information provided by the head when reading data from embedded servo sectors of a track of the one or more tracks, and for calculating a threshold value based on two or more values of the plurality of values when it is detected that the head is subject to a vibration condition, and for setting a threshold to the threshold value, and for providing a signal to inhibit writing by the head based on a comparison of at least one value of the plurality of values with the threshold.

2. The storage system of claim 1,
wherein the plurality of values are position error signal sample values; and
wherein the threshold is a write fault window.

3. The storage system of claim 1,
wherein the plurality of values are predicted position error signal sample values; and
wherein the threshold is a position error signal plus velocity (PPV) threshold.

4. The storage system of claim 1,
wherein servo controller is configured to initially set the threshold to an initial threshold value that is based on on-track track misregistration value.

5. The storage system of claim 1,
wherein the servo controller is configured to maintain the threshold value below a maximum threshold value that is based on a worst case off-track capability of the head.

6. The storage system of claim 1,
wherein the servo controller is configured to calculate the threshold value in accordance with a mathematical function that includes a variance calculated using the two or more values of the plurality of values.

7. The storage system of claim 6, wherein the mathematical function is of the form:

$$T=(\sqrt{v})*n+m;$$

wherein T is the threshold value;
wherein v is the variance; and
wherein n and m are real variables.

8. The storage system of claim 7,
wherein n is 3.

9. A method in a storage system, the method comprising:
setting a threshold to an initial threshold value;
obtaining a plurality of values, the plurality of values based on servo information provided by a head when reading data from embedded servo sectors of a track of a disk;

detecting when the storage system is subject to a vibration condition;

calculating a threshold value based on two or more values of the plurality of values when it is detected that the storage system is subject to the vibration condition;

setting the threshold to the threshold value; and disabling an operation in a case where a value of the plurality of values exceeds the threshold.

10. The method of claim 9, wherein the plurality of values are position error signal sample values; and wherein the threshold is a write fault window.

11. The method of claim 9, wherein the plurality of values are predicted position error signal sample values; and wherein the threshold is a position error signal plus velocity (PPV) threshold.

12. The method of claim 9, wherein the operation is at least one of a read and a write.

13. The method of claim 9, wherein said calculating the threshold value, comprises:

calculating the threshold value in accordance with a mathematical function that includes a variance calculated using the two or more values.

14. The method of claim 13, wherein the mathematical function is of the form:

$$T=(\sqrt{v})*n+m;$$

wherein T is the threshold value;

wherein v is the variance; and wherein n and m are real variables.

15. The method of claim 14, wherein n is 3.

16. A method, comprising:

detecting when a storage system is subject to a vibration condition;

obtaining a plurality of values, the plurality of values based on servo information provided by a head when reading from servo sectors of a track of a disk;

calculating a threshold value for a threshold a plurality of times while the storage system is subject to the vibration condition based on one or more values of the plurality of values; and disabling an operation in a case where a value of the plurality of values exceeds the threshold.

17. The method of claim 16, further comprising:

storing a predetermined number of most recently obtained values of the plurality of values;

wherein said calculating comprises:

calculating the threshold value for the threshold based on two or more values of the most recently obtained values when it is detected that the storage system is subject to the vibration condition.

18. The method of claim 16, said calculating comprising:

calculating the threshold value for the threshold based on two or more values of the plurality of values while the storage system is subject to the vibration condition.

19. The method of claim 18, said calculating the threshold value for the threshold based on two or more values of the plurality of values while the storage system is subject to the vibration condition, comprising:

calculating a variance based on the two or more values; and calculating the threshold value based on the variance.

20. The method of claim 16, wherein the operation is at least one of a read operation and a write operation.

21. The method of claim 16, wherein the plurality of values are position error signal sample values; and wherein the threshold is a write fault window.

22. The method of claim 16, said calculating comprising:

calculating the threshold value for the threshold three or more times while the storage system is subject to the vibration condition.

23. The method of claim 16, said detecting comprising:

detecting when the storage system is subject to the vibration condition based on at least one of a position error signal variance and a hardware shock sensor value.

24. The method of claim 16, said calculating comprising:

calculating the threshold value of the threshold the plurality of times based on position error signal sample values obtained while the storage system is subject to the vibration condition.

25. The method of claim 16, further comprising:

detecting, in an event that it is detected that the storage system is subject to the vibration condition, an end of the vibration condition; and setting, in an event that it is detected that the vibration condition has ended, the threshold to a particular value.

26. The method of claim 16, said calculating comprising:

calculating the threshold value for the threshold said plurality of times while the storage system is subject to the vibration condition based at least partially on two or more position error signal sample values obtained while the storage system is subject to the vibration condition.

27. The method of claim 16, said calculating comprising:

calculating the threshold value for the threshold said plurality of times while the storage system is subject to the vibration condition and during a write operation.

28. The method of claim 16, said calculating comprising:

calculating the threshold value for the threshold said plurality of times while the storage system is subject to the vibration condition and prior to an end of the vibration condition.

29. A method, comprising:

detecting when a storage system is subject to a vibration condition; and calculating a threshold value for a threshold a plurality of times while the storage system is subject to the vibration condition in accordance with a mathematical function that includes a variance calculated using position error signal sample values, wherein the mathematical function is of the form:

$$T=(\sqrt{v})*n+m;$$

wherein T is the threshold value;

wherein v is the variance; and wherein n and m are real variables.

* * * * *